United States Patent [19]

Huspen

[11] Patent Number: 5,074,588
[45] Date of Patent: Dec. 24, 1991

[54] CHILD SAFETY RESTRAINT

[76] Inventor: Fred Huspen, 2176 Wilderness Dr., Berrien Springs, Mich. 49013

[21] Appl. No.: 608,155

[22] Filed: Nov. 2, 1990

[51] Int. Cl.⁵ .......................................... B60R 22/00
[52] U.S. Cl. .................................. 280/801; 280/808; 297/465; 297/484
[58] Field of Search ............... 280/801, 803, 806, 808; 297/250, 253, 254, 384, 385, 389, 465, 484; 128/870, 876

[56] References Cited

U.S. PATENT DOCUMENTS

| | | | |
|---|---|---|---|
| 3,099,486 | 7/1963 | Scott et al. | 297/389 |
| 3,301,594 | 1/1967 | Pukish, Jr. | 297/389 |
| 3,315,671 | 4/1967 | Creelman et al. | 128/134 |
| 3,604,750 | 9/1971 | Doerling et al. | 297/389 |
| 3,791,694 | 2/1974 | Roberts et al. | 297/250 |
| 3,889,668 | 6/1975 | Ochs et al. | 128/134 |
| 4,050,737 | 9/1977 | Jordan et al. | 297/389 |
| 4,848,793 | 7/1989 | Huspen et al. | 280/801 |

FOREIGN PATENT DOCUMENTS 728849  4/1975  United Kingdom .

Primary Examiner—Kenneth R. Rice
Attorney, Agent, or Firm—Welsh & Katz, Ltd.

[57] ABSTRACT

A child safety restraint for a vehicle seat having a safety belt includes a stress plate having at least one safety belt slot for receiving the safety belt to secure the restraint to the seat, at least one harness slot and a harness for releasably securing a wearer's back to the stress plate, the harness including a pair of shoulder straps and a crotch strap secured at one end to the shoulder straps, the shoulder straps being configured to each pass through a respective harness slot in the plate so that the harness is slidably engaged on the plate.

20 Claims, 2 Drawing Sheets

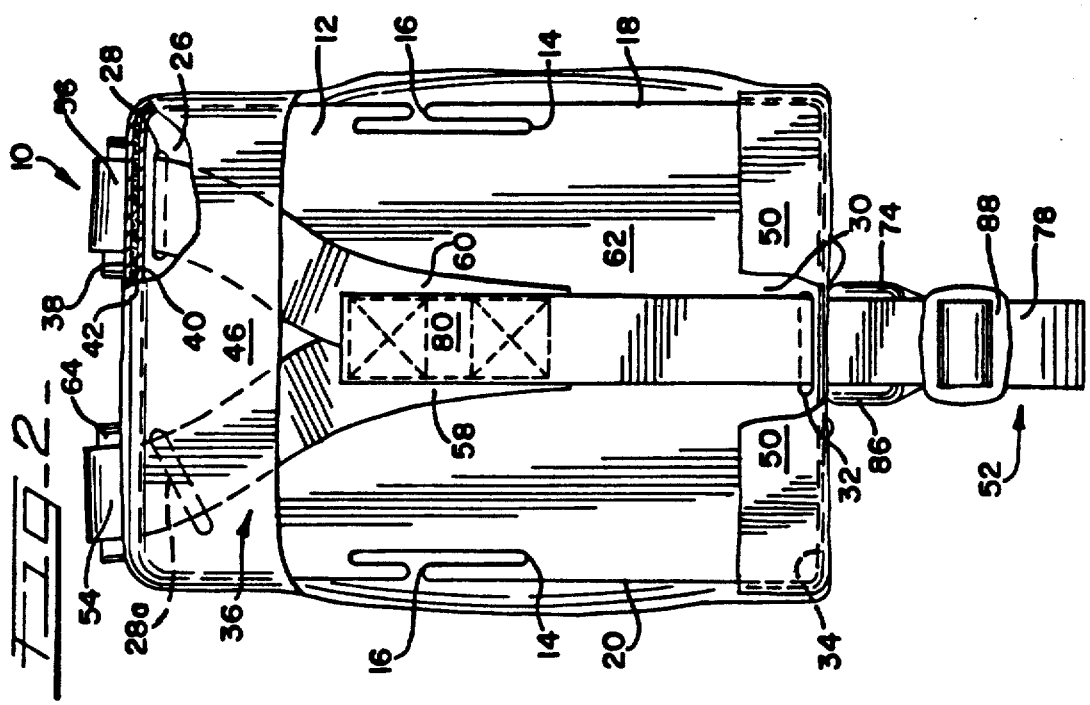
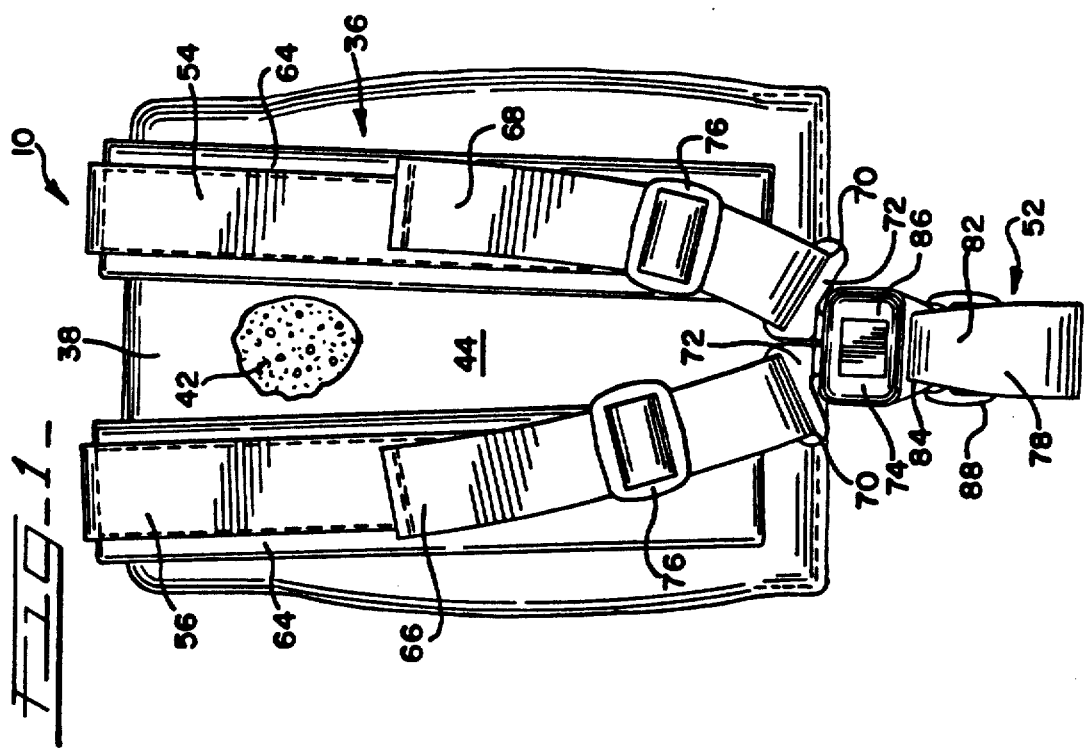

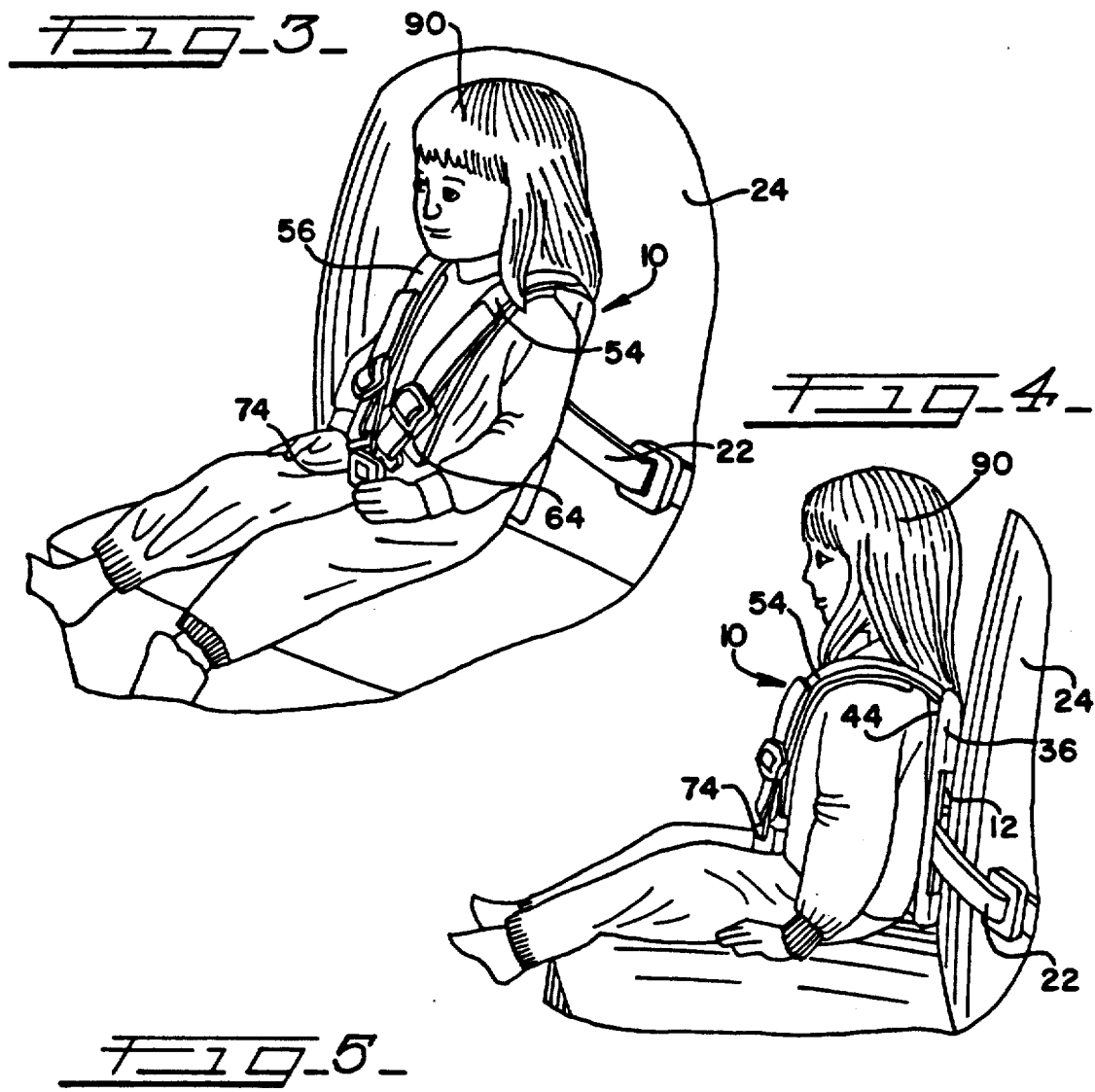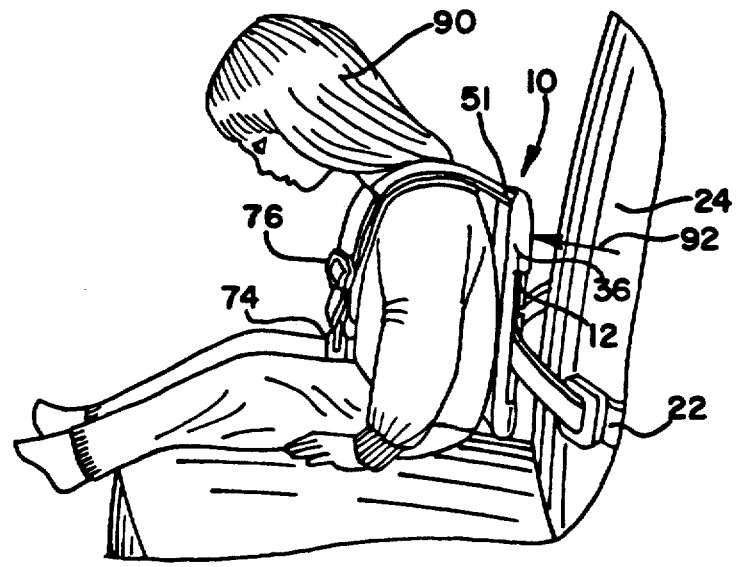

CHILD SAFETY RESTRAINT

BACKGROUND OF THE INVENTION

The present invention relates generally to vehicle safety restraints, and more specifically to such restraints used to protect children seated in vehicles from experiencing injury due to vehicular impact or sudden vehicular movement.

The use of "car seats" for infants and young children riding in automobiles has become widespread, largely due to government decree. Such seats usually consist of a hollow seat shell, are often padded, and are designed to be placed on the vehicle seat and secured to the vehicle's existing lap and/or shoulder belt system. In addition, such car seats usually include some sort of internal belt restraint system to prevent the infant from escaping from the seat, or from being thrown from the seat upon a rapid deceleration or impact of the vehicle. Infant car seats of this type are adequate for children up to about three years and about 50 pounds (18.2 kg), but older and larger children often find such a seat too confining and uncomfortable.

For older and/or larger children, larger types of car seats are available which include a metallic tubular frame adapted to be secured to the vehicle seat by the vehicular lap and/or shoulder belt system in similar fashion to the infant car seat described hereinabove. A larger padded seat having a shell type enclosure or housing and a child safety belt restraint is mounted to the frame. Very often, active and/or bored children find such seats unduly restrictive, and sometimes resent the idea of being forced to use a "child's seat", with unruly and disruptive behavior a consequence. Very frequently, these older children are still too small or light weight to properly fit into conventional, "adult size" shoulder and lap belt seat restraints.

In addition, car seats, whether designed for infants or older children, are bulky and difficult to store when not in use. For convenience sake, such seats are often "permanently" mounted in the vehicle even when children are not riding in the car.

In response to the drawbacks of conventional car seats, child restraining vests have been disclosed. Such vests basically consist of a padded plate having a harness for attachment to the child's back, and slots in the plate for accommodating the vehicular lap and/or shoulder belt system. One disadvantage of such vests is that the harness does not include a crotch strap, so that in some cases, a child may "submarine" or slide out from under the harness, either deliberately, or in certain accident conditions. Such a harness structure is also unsuitable for use in aircraft, since the child may easily fall out of the harness if the plane makes fairly rapid loops or rolls.

Another disadvantage of conventional restraining vests is the configuration of the aluminum stress plate, which bends under severe impact. Once bent, the plate may injure the child during the customary post impact rebound or whiplash.

Yet another disadvantage of conventional restraining vests is that the shoulder belts are not properly positioned upon the plate to be pulled evenly upon loading. This disadvantage may cause the plate to shift during impact, providing less than optimum protection to the child.

Thus, there is a need for a child safety restraint including a harness system which prevents "submarining", which enables the stress plate to follow and center upon the wearer's torso, and which includes a stress plate which does not deform under impact.

SUMMARY OF THE INVENTION

Accordingly, the present child safety restraint includes a rigid stress plate and sliding harness system designed to overcome the above-identified disadvantages of conventional vest type vehicle seat restraints. In the present restraint, the plate is more rigid than conventional restraints, and the harness is designed so that the plate centers itself upon the back of the wearer to provide maximum support and to prevent injury.

More specifically, the present restraint includes a stress plate having at least one safety belt slot for receiving the vehicle safety belt to secure the restraint to the seat, at least one harness slot, and a harness for releasably securing a wearer's back to the stress plate. The harness includes a pair of shoulder straps and a crotch strap secured at one end to the shoulder straps, the shoulder straps being configured to each pass through a respective harness slot in the plate so that the harness is slidably engaged on the plate.

BRIEF DESCRIPTION OF THE DRAWINGS

FIG. 1 is a front elevational view of the present child safety restraint, with portions shown broken away for clarity;

FIG. 2 is a rear elevational view of the safety restraint shown in FIG. 1, with portions shown broken away for clarity;

FIG. 3 is a front perspective elevational view of the restraint of FIG. 1 shown being worn by a child in a vehicle seat;

FIG. 4 is a side elevational view of the child and safety vest as seen in FIG. 3 in the normal riding position; and FIG. 5 is a side elevational view of the child and safety vest as seen in FIG. 3 showing the effect of the restraint upon a sudden deceleration of the vehicle.

DESCRIPTION OF THE PREFERRED EMBODIMENT

Referring now to FIGS. 1 and 2, the child safety restraint of the invention is indicated generally at 10. The restraint 10 includes a stress plate 12 formed of rigid sheet material such as sheet metal or high-strength molded plastic, and in the preferred embodiment is a single piece of stamped, 6061 TR6 aluminum having a thickness on the order of at least 3/16 inch. It is contemplated that the plate be approximately eight inches wide and eleven inches tall, or with an area of between 85 and 90 square inches. This is a size which will properly fit the upper torsos of children up to about 70 pounds, and will provide sufficient support upon sudden deceleration of the vehicle.

The plate 12 is provided with at least one and preferably two vertical safety belt slots 14, each having a short horizontal slot 16 in communication with the corresponding slot 14 and providing access thereto from a corresponding side edge 18, 20 of the plate 12. The slots 14 are configured to receive a vehicle lap and/or shoulder belt 22 (best seen in FIG. 3) which is used to secure the restraint 10 to a vehicle seat 24 (best seen in FIG. 3). The vehicle seat 24 is designed to be representative of a variety of vehicle seats, including seats installed in automobiles, boats, trains, as well as airplanes.

An upper portion 26 of the plate 12 is provided with at least one upper harness slot 28, two such slots being preferred as seen in FIG. 2. The slot 28 is depicted as being generally horizontal, however it is also contemplated that, in certain applications, both of the slots 28 may be oriented at an angle to the horizontal, with an upper end of each slot pointing toward the center of the upper portion 26. Such orientation is shown at 28a, although it will be appreciated that both slots 28 or 28a will have a similar, i.e., horizontal or angled orientation. A lower portion 30 of the plate 12 is provided with a lower harness slot 32, which in the preferred embodiment is centrally located on the lower portion near a lower edge 34 of the plate 12.

In order to provide comfort to the user, the restraint 10 is provided with a padded covering 36 which in the preferred embodiment includes outer and inner sheets 38, 40 of wear-resistant synthetic material such as vinyl. The sheets 38, 40, are disposed to enclose a layer of resilient filler material 42, such as soft foam made of synthetic material such as polyurethane. If desired, the covering 36 may be made of alternate materials as the dictates of comfort, durability, and cost permit. The covering 36 is made up of a front panel 44, a rear yoke panel 46 secured to an upper edge 48 of the front panel, and a lower rear panel 50 secured to the lower edge of the front panel. The rear yoke panel 46 and the lower rear panel 50 are secured to the front panel 44 such as by stitching, to define a pocket into which the plate 12 is inserted. If desired, the front panel 44 may be provided with slits 51 (best see in FIG. 5) which register with the upper harness slots 28.

Once the plate 12 is inserted behind the front panel 44, and the rear portions 48, 50 of the covering 36 are stitched to the front panel, the plate may not be removed from the covering. This feature promotes the safe use of the restraint 10 by preventing disassembly.

The restraint 10 also includes a harness 52 which secures the covered plate 12 to the back of the user (best seen in FIG. 4). The harness 52 includes a pair of webbed shoulder belts 54 and 56, each of which is fabricated of parachute grade nylon or other material of equivalent strength and flexibility. The shoulder belts 54 and 56 each have respective rear ends 58, 60 which are secured to each other behind a rear side 62 of the plate 12. The belts 54, 56 are also each passed through a respective upper harness slot 28 and a corresponding slit 51 to the front of the restraint 10.

In addition, the belts, 54, 56 are each provided with at least one shoulder pad 64. The shoulder pads 64 are preferably of tubular construction filled with padding material to give them softness and bulk. The pads 64 are configured and disposed upon the belts 54, 56 to provide comfort to the user, as well as to distribute deceleration loads over the user's upper torso. In addition, each of the belts 54, 56 also has a respective front or free end 66, 68 which is passed through an eyelet 70 of one of two tangs 72 of a two-phase quick release buckle 74. In such a buckle 74, the shoulder belts 54, 56 are separately secured within the buckle housing. Each belt 54, 56 may be provided with an additional buckle 76 for purposes of adjusting length.

The harness 52 also includes a crotch strap 78 having a rear end 80 attached such as by stitching to the attached rear ends 58, 60 of the shoulder belts 54, 56. The crotch strap 78 is made of similar material to the shoulder belts 54, 56 and is passed through the lower harness slot 32 in the plate 12, is looped beneath a lower edge 34 of the plate 12, and has a front or free end 82 which is passed through an eyelet 84 in a latch portion 86 of the quick release buckle 74. As was the case with the shoulder belts 54, 56, the crotch strap 78 may be provided with an additional buckle 88 for purposes of adjusting length. Thus, the harness 52 is not secured to the plate 12, but is slidably engaged therein.

Referring now to FIGS. 3 and 4, the restraint 10 of the invention is depicted as worn by a child user 90 seated on the vehicle seat 24 in a normal riding position. It will be seen that the restraint 10 is secured to the seat 24 by the passage of the vehicle seat belt 22 between the front panel 44 of the covering 36 and the front face of the plate 12, and, as described above, through the slots 14.

Once the restraint 10 is secured to the seat 24, the user 90 is secured within the restraint by having the user sit against the front panel 44, disposing a shoulder belt 54, 56 over each of the user's shoulders, and by bringing the crotch strap 78 up between the user's legs. The belts 54, 56 and the strap 78 are fastened together by the buckle assembly including the tangs 72 and the buckle 74. In order to achieve a snug fit of the restraint 10 upon the user 90, adjustment of the respective lengths of the belts 54, 56 and the strap 78 may be made through the use of the buckles 76 and 88.

Referring now to FIG. 5, should the vehicle become subject to rapid deceleration, such as through a sudden stop or an impact, the inertia of the vehicle will act to force the user forward in the direction indicated by the arrow 92. When only conventional lap belts are used by young children, this inertia tends to cause the child's head to contact his knees in an envelope effect. Although the child would be prevented from being thrown around the inside of the vehicle by the lap belt, the bent-over reaction has been known to cause internal and spinal injuries.

In cases where conventional vest type restraints are used, the smaller sized, thinner plates used on such restraints have been known to bend forward through the force of impact loading from the sudden stop. Thus, once the vehicle has stopped, the resulting backward force or whiplash may causes the child to be injured by contacting the hard, forward-facing edge of the plate.

In contrast, the present restraint 10 follows the user 90 forward, remains centrally located on the user's upper torso, and does not bend forward to a noticeable degree upon impact loading. These properties are due in large part to the wider and thicker plate 12 which is resistant to bending and which supports the torso, and to the harness 52 which is slidably engaged with the plate 12. Tests of the present restraint 10 have shown that the force exerted on the plate 12 by the user being thrust forward is centered in the middle of the plate 12. Also, it has been found that the angled orientation of the straps 28a facilitates an even loading of the harness 52.

Further, the addition of the crotch strap 78 facilitates the continued engagement of the user 90 with the restraint 10, and also prevents "submarining" of the user 90 out from under the harness 52. The crotch strap 78 will also more securely restrain the user 90 if the restraint 10 is used in an airplane seat. In this manner, the user's torso will not bend forward, and injury upon the user 90 falling back against the seat 24 is prevented.

When the restraint 10 is not in use, it may be easily unbuckled from the seat and becomes fairly flat for easy storage. Even if the restraint 10 is left buckled to the seat 24, its flat shape will enable the seat to be used for carrying other articles.

While a particular embodiment of the child safety restraint of the invention has been shown and described, it will be appreciated by those skilled in the art that changes and modifications may be made thereto without departing from the invention in its broader aspects and as set forth in the following claims.

What is claimed is:

1. A child's safety restraint for use in a vehicle having a seat and a safety belt, said restraint comprising:

a stress plate having a front side and a rear side, at least one safety belt slot for receiving the safety belt to secure the restraint to the seat, and at least one harness slot;

a harness for releasably securing a wearer's upper torso to said stress plate, said harness including a pair of shoulder straps and a crotch strap, said shoulder straps and said crotch strap being configured to each pass through a respective harness slot in said plate so that said harness is slidable as a unit relative to said plate;

said shoulder straps each having a rear end and a free end, said rear ends secured to each other behind said rear side of said plate;

said crotch strap having a rear end and a free end, said rear end attached to said rear ends of said shoulder straps; and said slidability of said harness relative to said plate being such that, upon rapid deceleration of the vehicle, said restraint follows the user forward and remains centrally located on the user's upper torso.

2. The restraint as defined in claim 1 wherein said stress plate has a pair of shoulder harness slots in an upper portion of said plate, and a crotch strap slot in a lower portion of said plate.

3. The restraint as defined in claim 2 wherein said shoulder harness slots are each slightly angled, with an upper end of said slots pointing toward a center of an upper portion of said plate.

4. The restraint as defined in claim 1 wherein said free end of said crotch strap and said free ends of said shoulder straps are adapted to be releasably secured to each other.

5. The restraint as defined in claim 4 wherein said free ends of said shoulder straps and said crotch strap are releasably secured to each other by a buckle.

6. The restraint as defined in claim 5 wherein said buckle is a two-phase buckle.

7. The restraint as defined in claim 1 further including a cushion fixed to said plate to protect the back of the wearer.

8. The restraint as defined in claim 1 wherein said plate is made of aluminum.

9. The restraint as defined in claim 1 wherein said plate is approximately 8 inches wide and approximately 11 inches tall.

10. The restraint as defined in claim 1 wherein said plate is at least 3/16 inch thick.

11. A child's safety restraint for use in a vehicle having a seat and a safety belt, said restraint comprising:

a stress plate having a front end and a rear end, at least one safety belt slot for receiving the safety belt to secure the restraint to the seat, and upper and lower harness slots;

a harness for releasably securing a wearer's upper torso to said stress plate, said harness including a pair of shoulder straps and a crotch strap, said shoulder straps and said crotch strap being configured to each pass through a respective harness slot in said plate so that said harness is slidable as a unit relative to said plate;

said shoulder straps having a rear end and a free end, said rear ends secured to each other behind said rear portion of said plate;

said crotch strap having a rear end and a free end, said rear end attached to said rear ends of said shoulder straps;

said slidability of said harness relative to said plate being such that, upon rapid deceleration of the vehicle, said restraint follows the user forward and remains centrally located on the user's upper torso; and said restraint being the only support structure provided to the wearer, and said restraint being utilized independent of any other safety seat structure.

12. The restraint as defined in claim 11 further including a cushion fixed to said plate to protect the back of the wearer.

13. The restraint as defined in claim 11 wherein said plate is made of aluminum.

14. The restraint as defined in claim 11 wherein said plate is approximately 8 inches wide and approximately 11 inches tall to support the back of the wearer.

15. The restraint as defined in claim 11 wherein said plate is at least 3/16 inch thick so as not to deform upon impact loading.

16. A child's safety restraint for use by a child while riding in a vehicle having a seat and a safety belt, said restraint comprising:

a stress plate configured from a rigid sheet material of at least a 3/16 inch thickness and having a surface area of at least 85 square inches, said plate having a front side and a rear side, said plate having further at least one safety belt slot for receiving the safety belt to secure the restraint to the seat, and upper and lower harness slots;

a harness for releasably securing a wearer's upper torso to said stress plate, said harness including a pair of shoulder straps and a crotch strap, said shoulder straps and said crotch strap being configured to each pass through a respective harness slot in said plate so that said harness is slidable as a unit relative to said plate;

said shoulder straps having a rear end and a free end, said rear ends secured to each other behind said rear side of said plate;

said crotch strap having a rear end and a free end, said rear end attached to said rear ends of said shoulder straps;

said slidability of said harness relative to said plate being such that, upon rapid deceleration of the vehicle, said restraint follows the user forward and remains centrally located on the user's upper torso; and said restraint being the only support structure provided to the wearer, and said restraint being utilized independent of any other safety seat structure.

17. The restraint as defined in claim 16 wherein said shoulder harness slots are each slightly angled, with an upper end of said slots pointing toward a center of an upper portion of said plate.

18. The restraint as defined in claim 16 wherein said shoulder straps each have at least one shoulder pad disposed upon said straps to provide distribution of deceleration loads over the user's upper torso.

19. The restraint as defined in claim 16 wherein said free end of said crotch strap and said free ends of said shoulder straps are adapted to be releasably secured to each other.

20. The restraint as defined in claim 16 further including a cushion fixed to said front side of said plate to protect the back of the wearer.

* * * * *